United States Patent Office 3,850,961
Patented Nov. 26, 1974

3,850,961
1H-3-AMINO DERIVATIVES OF CYCLOPENTA(β) THIANAPHTHENE
John T. Suh, Mequon, Wis., assignor to Colgate-Palmolive Company, New York, N.Y.
No Drawing. Continuation-in-part of applications Ser. No. 599,744, Dec. 7, 1966, now Patent No. 3,497,528, Ser. No. 9,947, Feb. 9, 1970, now Patent No. 3,682,967, and Ser. No. 224,273, Feb. 7, 1972, now abandoned. This application Sept. 21, 1973, Ser. No. 399,293
Int. Cl. A61k 27/00; C07d 63/22
U.S. Cl. 260—330.5                           4 Claims

ABSTRACT OF THE DISCLOSURE

The compounds are 1H-3-aminocyclopenta[β]thianaphthenes which are useful as central nervous system stimulants of the antidepressant type. A compound disclosed is 1H-3-aminocyclopenta[β]thianaphthene hydrochloride.

RELATED CASES

This application is a continuation-in-part of my earlier applications Ser. No. 599,744, filed Dec. 7, 1966, titled "3-Aminoalkyl and 3-Amino Derivatives of Cyclopenta[β] Thianaphthene," now U.S. Pat. No. 3,497,528; Ser. No. 9,947, filed Feb. 9, 1970, titled "1H-3-(Substituted Aminoalkylidene)Cyclopenta[β]Thianaphthenes," now U.S. Pat. No. 3,682,967; and Ser. No. 224,273, filed Feb. 7, 1972, titled "1H-3-Amino Derivatives of Cyclopenta[β]Thianaphthenes," now abandoned.

DESCRIPTION OF INVENTION

The compounds of the present invention have the following formula

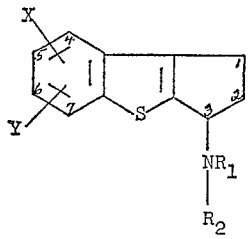

wherein X and Y are hydrogen, halogen such as chloro, bromo or fluoro and trifluoromethyl, $R_1$ and $R_2$ are selected from hydrogen, lower alkyl of 1 to 4 carbon atoms such as methyl, ethyl or isopropyl, or an aralkyl of 7 to 13 carbon atoms such as benzyl, phenethyl and phenylisopropyl.

The compounds of the present invention may be conveniently prepared by employing as the starting material a 1H-cyclopenta[β]thianaphthene-3-one of the formula

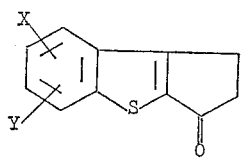

The ketones may be conveniently prepared as described in the literature (M.P. Cagniant and Mme. P. Cagniant: Bulletin de la Societe Chimique de France, pp. 185–190 (1953)).

Representative of the ketones which may be employed as starting materials are the following:

1H-cyclopenta[β]thianaphthene-3-one,
5-methoxy-1H-cyclopenta[β]thianaphthene-3-one,
6-chloro-1H-cyclopenta[β]thianaphthene-3-one,
6-bromo-1H-cyclopenta[β]thianahthene-3-one, and
7-trifluoromethyl-1H-cyclopenta[β]thianaphthene-3-one The compounds of the present invention which have the the formula

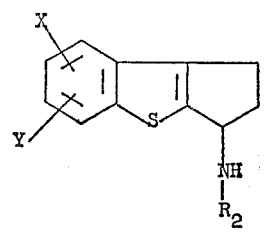

in which $R_2$ is hydrogen are readily formed by converting the starting ketone to the corresponding oxime and then treating the oxime with lithium aluminum hydride to form the primary amine.

The ketones are converted to the oximes by reacting them with hydroxylamine, advisably in an organic reaction medium in which the reactants are soluble. The hydroxylamine can be produced in situ by the neutralization of an hydroxylamine salt such as the hydrochloride. Inorganic bases such as alkali metal hydroxides, carbonates and bicarbonates, as well as organic bases such as pyridine, can be used to neutralize the acid released from the hydroxylamine salt.

The described process for preparing the primary amines may be diagrammed as follows:

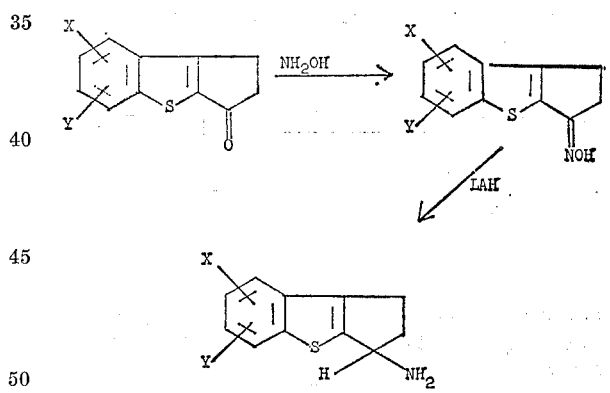

Representative of the compounds which may be prepared in the above-described manner are the following:

1H-3-aminocyclopenta[β]thianaphthene,
1H-3-amino-5-chlorocyclopenta[β]thianaphthene,
1H-3-amino-5-hydroxycyclopenta[β]thianaphthene, and
1H-3-amino-6-bromocyclopenta[β]thianaphthene.

A wide variety of amine derivatives may be prepared from the above-described primary amines by conventional techniques. For example, the compounds in which $R_1$ and/or $R_2$ are alkyl or aralkyl may be prepared by treating the primary amine with an alkyl halide, and the compounds in which $R_2$ is —$CH_2$—B—Am may be prepared by treating the amine with a suitable aminoalkyl ester or alternatively treating the primary amine with an aminoalkyl acyl halide followed by treatment with lithium aluminum hydride. The compounds in which $R_1$ and $R_2$ are both methyl may be prepared by treating the amine with formaldehyde and formic acid.

The above-described processes may be illustrated as follows:

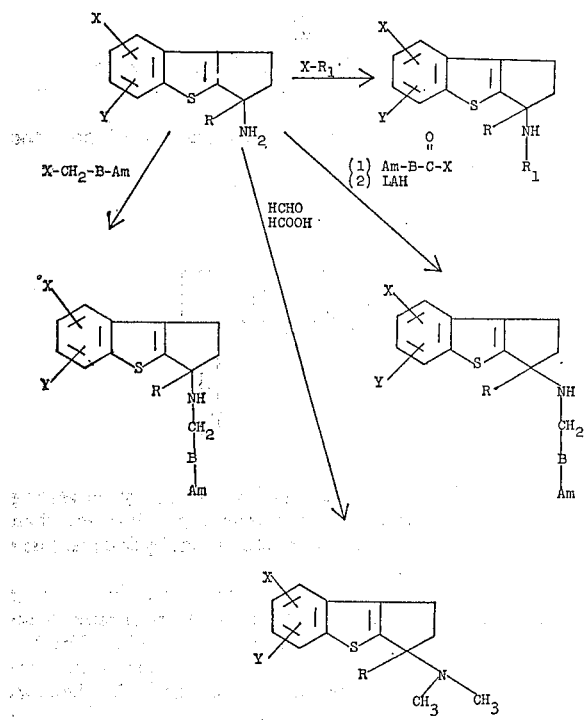

in which X is a reactive halide and $R_1$ is not hydrogen, and all other symbols are as previously defined and represent groups which do not partake in or interfere with the reactions.

The guanidino derivative may be readily prepared by treating a primary amine with methyl pseudothiourea in 70% aqueous ethanol under reflux conditions.

The described process may be illustrated as follows:

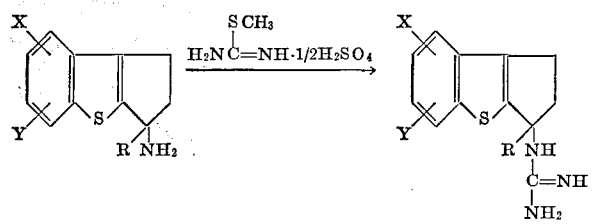

in which all symbols are as previously defined and represent groups that do not partake in or interfere with the reaction.

Representative of the compounds which may be prepared by the above-described processes are the following:

1H-3-dimethylaminocyclopenta[β]thianaphthene,
1H-3-guanidinocyclopenta[β]thianaphthene,
1H-3-(γ-dimethylaminopropylamino)-cyclopenta[β]thianaphthene, and
1H-3-methylaminocyclopenta[β]thianaphthene.

The compounds in which $R_2$ is —$CH_2$—B—Am and Am is —$NHR_1$ or $NH_2$ may be prepared by subjecting the corresponding mono or dibenzyl compounds to cleavage of the benzyl groups as was previously described.

Representative of the compounds which can be prepared in the described manner are the following:

1H-3-(γ-methylaminopropylamino)-cyclopenta[β]thianaphthene, and
1H-3-aminopropylaminocyclopenta[β]thianaphthene.

Acid addition salts of the compounds of the present invention, capable of forming such salts, may be conveniently prepared by contacting the compounds with a suitable acid such as formic acid, citric acid, maleic acid, sulfuric acid, hydrochloric acid, succinic acid, tartaric acid, benzoic acid or fumaric acid.

Quaternary ammonium salts may be formed by contacting the compounds which are capable of forming such salts with a suitable alkylating agent such as dimethyl sulfate or an alkyl halide such as methyl chloride, methyl iodide or ethyl bromide.

The novel compounds of the present invention, which are amines, and their pharmaceutically acceptable salts, have utility as central nervous system stimulants of the antidepressant type. For example, the compound 1H-3-aminocyclopenta[β]thianaphthene hydrochloride in a nonlethal dose of 10 mg./kg. intraperitoneally caused central nervous system stimulation in mice as characterized by hyperirritability, aggression, and elevated startle, touch and pain responses. Similar activity is seen when antidepressants such as desipramine are given to mice. The behavioral studies were conducted in accordance with the procedure set forth by Irwin in "Animal and Clinical Pharmacologic Techniques in Drug Evaluation," J. H. Nodine and P. E. Siegler, ed., Year Book Publishers, Inc., 1964, pp. 36–54.

The compounds are preferably combined with one or more suitable pharmaceutical diluents and formed into unit dosage forms. Such dosage forms provide suitable means for oral and parenteral administration.

The pharmaceutical diluents which may be employed may be either liquid or solid, but the preferred liquid carrier is water. In the event the compound is not soluble in water, a pharmaceutically acceptable organic solvent such as propylene glycol may be employed.

Solid pharmaceutical diluents such as starch, sugar and talc can be utilized to form powders which can in turn be used as such or may be tableted or encapsulated. In addition to the forementioned material, a wide variety of conventional pharmaceutical lubricants, disintegrating agents, flavoring agents and the like may also be employed.

The unit dosage forms may contain a concentration of 0.1% to 10% or more by weight of one or more of the novel compounds. Generally, such dosage forms will contain about 5 to 150 mg. of the active ingredients. One or more of such dosage forms may be administered daily.

The following examples are presented to illustrate this invention:

EXAMPLE 1

1H-cyclopenta[β]thianaphthene-3-one

A solution of 2.7 g. (0.0131 mole) of β-(3-thianaphthenyl)propionic acid in 50 ml. of thionyl chloride is allowed to reflux for 25 minutes and the excess thionyl chloride is distilled in vacuo. To the residue in 50 ml. of anhydrous benzene is added in portions 3 g. of anhydrous aluminum chloride with cooling and the reaction mixture stirred overnight at room temperature. The reaction mixture is cooled and treated with ice water and 25 ml. of 10% hydrochloric acid solution. The organic layer is separated and the aqueous layer extracted with 50 ml. of benzene. The combined benzene solution is washed successively with water, saturated sodium bicarbonate, water, and dried over anhydrous sodium sulfate. The benzene solution is distilled in vacuo and the residue recrystallized from ethanol to give 1H-cyclopenta[β]thianaphthene-3-one, m.p. 160–161°.

Analysis.—Calcd. for $C_{11}H_8OS$: S, 17.03; Found: S, 17.07.

EXAMPLE 2

1H-cyclopenta[β]thianaphthene-3-one oxime

To a solution of 1.3 g. (0.069 mole) of the ketone of Example 1 in 100 ml. of ethanol is added with stirring a solution of 0.69 g. (0.01 mole) of hydroxylamine hydrochloride in 10 ml. of water and 0.8 g. (0.01 mole) of sodium acetate in 100 ml. of water. The reaction mixture is then allowed to reflux for 10 minutes and stirred overnight at room temperature. The reaction mixture is diluted with 100 ml. of water and the product filtered and recrystallized from dilute ethanol to give the oxime, m.p. 222°.

*Analysis.*—Calcd. for $C_{11}H_9NOS$: S, 15.78. Found: S, 16.07.

EXAMPLE 3

1H-3-aminocyclopenta[β]thianaphthene hydrochloride

To a suspension of 3.68 g. (0.1 mole) of lithium aluminum hydride in 150 ml. of tetrahydrofuran (THF) is added in portions 4.6 g. of the oxime and the mixture allowed to reflux for one hour and then stirred at room temperature for 2 hours. An additional 200 ml. of THF is added and the reaction mixture carefully decomposed with 20 ml. of water. The reaction mixture is filtered and the residue washed with THF. The combined solution is distilled *in vacuo* and the basic residue converted to the hydrochloride salt in ether. The salt is dissolved in 200 ml. of water, made basic with 5% sodium hydroxide solution, extracted with two 100 ml. portions of ether, and dried over anhydrous sodium sulfate. The basic residue is converted to the hydrochloride salt in ether and recrystallized from methanol-ether to give 1H-3-aminocyclopenta[β]thianaphthene hydrochloride, light brown powder, m.p. 261-263°.

*Analysis.*—Calcd. for $C_{11}H_{12}ClNS$: C, 58.54; H, 5.36; N, 6.52; Cl, 15.71. Found: C, 58.31; H, 5.63; N, 5.96; Cl, 15.35.

EXAMPLE 4

1H-3-(γ-dimethylaminopropyl)cyclopenta[β] thianaphthene-3-ol hydrochloride

To the Grignard reagent prepared from 2.19 g. (0.09 mole) of magnesium and 10.9 g. (0.13 mole) of freshly distilled γ-dimethylaminopropyl chloride in 100 ml. of THF is added in portions a solution 8.5 g. (0.045 mole) of the ketone of Example 1 in 100 ml. of THF over ½ period. The reaction mixture is stirred at room temperature for 16 hours and decomposed with 20 ml. of saturated ammonium chloride. The reaction mixture is filtered and the residue washed with THF. The combined THF solution is distilled *in vacuo* and the basic residue dissolved in ether. The ether insoluble material is removed by filtration and the ether solution washed with water, dried over anhydrous sodium sulfate, and treated with anhydrous hydrogen chloride. The product is recrystallized from ethanol-ether to give 1H-3-(γ-dimethylaminopropyl)cyclopenta[β]thianaphthene - 3 - ol hydrochloride, light brown powder, m.p. 185-187°.

*Analysis.*—Calcd. for $C_{16}H_{22}ClNOS$: Cl, 11.37. Found: Cl, 11.09.

EXAMPLE 5

1H-3-(γ-dimethylaminopropylidene)cyclopenta[β] thianaphthene hydrochloride

To the Grignard reagent prepared from 3.0 g. (0.12 mole) of magnesium and 14.9 g. (0.12 mole) of γ-dimethylaminopropyl chloride in 100 ml. of THF is added a solution of 11.5 g. (0.06 mole) of 1H-cyclopenta[β]thianaphthene-3-one in 200 ml. of THF over 1¼ hours. The reaction mixture is stirred at room temperature for 16 hours and decomposed with 30 ml. of saturated ammonium chloride solution. The reaction mixture is filtered and the residue washed with THF. The combined THF solution is distilled *in vacuo*, and the ether solution washed with water, dried, and adjusted to pH 6 slowly with ethereal hydrogen chloride. The product is recrystallized once from ethyl alcohol and once from methyl alcohol and dried *in vacuo* at 110° to yield 1H-3-(γ-dimethylaminopropylidene)cyclopenta[β]thianaphthene hydrochloride, m.p. 211–213°. After two recrystallizations from ethyl alcohol, the product melted at m.p. 213–214.5°.

*Analysis.*—Calcd. for $C_{16}H_{20}ClNS$: C, 65.40; H, 6.86; N, 4.77. Found: C, 64.90; H, 7.00; N, 4.67.

EXAMPLE 6

1H-3-(carbethoxymethylene)cyclopenta[β] thianaphthene

To a solution of 3.84 g. (0.08 mole) of 50% sodium hydride in 250 ml. of freshly distilled dimethoxyethane is added 17.9 g. (0.08 mole) of triethylphosphonoacetate dissolved in 30 ml. of dimethoxyethane within 15 minutes while maintaining the reaction temperature at 15–20°. The solution is stirred at room temperature for 1 hour, after which 15 g. (0.08 mole) of finely ground 1H-cyclopenta[β]thianaphthene-3-one is added in portions within 10 minutes. The mixture is stirred at room temperature for 16 hours and refluxed for 2 hours. The mixture is cooled, poured into 3.5 liters of ice water, and cooled. The resulting solids are collected by filtration, dried, and extracted with 200 ml. of refluxing chloroform. The insoluble material is removed by filtration and the filtrate concentrated *in vacuo* to yield a dark solid which is dissolved in 100 ml. of ethanol. The insoluble material is again removed by filtration and the filtrate cooled to yield a crystalline solid which is recrystallized from ethanol to yield 1H-3-(carbethoxymethylene)cyclopenta[β]thianaphthene in the form of a gold brown crystalline solid, m.p. 137–139°.

*Analysis.*—Calcd. for $C_{15}H_{14}O_2S$: C, 69.74; H, 5.47. Found: C, 69.74; H, 5.54.

I claim:

1. A compound selected from compounds of the formula

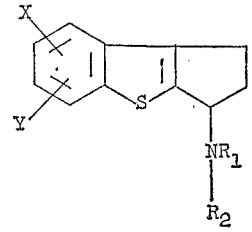

wherein X and Y are hydrogen, halo and trifluoromethyl, and $R_1$ and $R_2$ are selected from hydrogen, lower alkyl and aralkyl of 7 to 13 carbon atoms, and pharmaceutically acceptable salts thereof.

2. A compound of claim 1 in which X and Y are hydrogen.

3. A compound of claim 1 in which $R_1$ and $R_2$ are hydrogen.

4. A compound of claim 1 in which X, Y, $R_1$ and $R_2$ are hydrogen.

References Cited

UNITED STATES PATENTS 3,803,180    4/1974    Berger et al. ____ 260—346.2 M

HENRY R. JILES, Primary Examiner

C. M. S. JAISLE, Assistant Examiner

U.S. Cl. X.R.

424—275